United States Patent
Oliver et al.

(10) Patent No.: US 7,305,550 B2
(45) Date of Patent: Dec. 4, 2007

(54) SYSTEM AND METHOD FOR PROVIDING AUTHENTICATION AND VERIFICATION SERVICES IN AN ENHANCED MEDIA GATEWAY

(75) Inventors: Neal C. Oliver, Florham Park, NJ (US); Michael A. Yudkowsky, Chicago, IL (US)

(73) Assignee: Intel Corporation, Santa Clara, CA (US)

( * ) Notice: Subject to any disclaimer, the term of this patent is extended or adjusted under 35 U.S.C. 154(b) by 1393 days.

(21) Appl. No.: 09/750,227

(22) Filed: Dec. 29, 2000

(65) Prior Publication Data

US 2002/0087858 A1    Jul. 4, 2002

(51) Int. Cl.
| | |
|---|---|
| H04L 9/00 | (2006.01) |
| H04L 9/32 | (2006.01) |
| H04K 9/00 | (2006.01) |
| H04K 1/00 | (2006.01) |
| G06F 15/173 | (2006.01) |
| G06F 15/16 | (2006.01) |

(52) U.S. Cl. ...................... 713/156; 713/155; 713/173; 713/182; 380/247; 709/223; 709/224; 709/225; 709/226; 709/229

(58) Field of Classification Search ........ 713/155–156, 713/173, 182, 200–202; 380/247, 47; 709/223–229
See application file for complete search history.

(56) References Cited

U.S. PATENT DOCUMENTS 4,837,804 A * 6/1989 Akita ...................... 379/88.02

(Continued)

FOREIGN PATENT DOCUMENTS

WO    WO 00/77974 A1    12/2000

OTHER PUBLICATIONS

International Telecommunication Union, ITU-T Telecommunication Standardization Sector of ITU, H.248 (Jun. 2000), "Series H: Audiovisual and Multimedia Systems Infrastructure of Audiovisual Services—Comunication Procedures, Gateway Control Protocol", International Telecommunication Union H.248 (Jun. 2000)—Prepublished Version, pp. 1-113.

(Continued)

*Primary Examiner*—Ayaz Sheikh
*Assistant Examiner*—Shin-Hon Chen
(74) *Attorney, Agent, or Firm*—Kevin A. Reif

(57) ABSTRACT

A system and method for facilitating authentication or identification services including an authentication server configured to provide an authentication certificate to a user of a first client device for authentication or identification of a user of a second client device. The first and second client devices are configured to communicate with each other and the authentication server. Each of the first and second client devices includes a user control program configured to communicate data to and from the authentication server. A media gateway is coupled to the authentication server to enable communication of media data from the first and second client devices to the authentication server. The user control program of the first client device is configured to receive a certificate corresponding to the user of the second client device and the authentication certificate from the authentication server. The user control program of the first client device is configured to authenticate the user of the second client device by comparing the certificate corresponding to the second client device and the authentication certificate.

20 Claims, 15 Drawing Sheets

U.S. PATENT DOCUMENTS

| | | | | |
|---|---|---|---|---|
| 4,876,717 | A * | 10/1989 | Barron et al. | 726/5 |
| 5,933,816 | A * | 8/1999 | Zeanah et al. | 705/35 |
| 6,088,805 | A | 7/2000 | Davis et al. | |
| 6,108,788 | A | 8/2000 | Moses et al. | |
| 6,134,550 | A | 10/2000 | Van Oorschot et al. | |
| 6,324,271 | B1 * | 11/2001 | Sawyer et al. | 379/142.05 |
| 6,341,128 | B1 * | 1/2002 | Svedberg | 370/352 |
| 6,353,929 | B1 * | 3/2002 | Houston | 725/20 |
| 6,430,174 | B1 * | 8/2002 | Jennings et al. | 370/352 |
| 6,434,403 | B1 * | 8/2002 | Ausems et al. | 455/556.2 |
| 6,496,571 | B1 * | 12/2002 | Wilson | 379/93.23 |
| 6,615,171 | B1 * | 9/2003 | Kanevsky et al. | 704/246 |
| 6,636,975 | B1 * | 10/2003 | Khidekel et al. | 713/202 |
| 6,668,044 | B1 * | 12/2003 | Schwartz et al. | 379/68 |
| 6,768,788 | B1 * | 7/2004 | Orolin et al. | 379/67.1 |
| 6,789,193 | B1 * | 9/2004 | Heiden | 713/175 |
| 6,885,734 | B1 * | 4/2005 | Eberle et al. | 379/88.01 |
| 6,895,084 | B1 * | 5/2005 | Saylor et al. | 379/88.22 |
| 6,964,012 | B1 * | 11/2005 | Zirngibl et al. | 715/513 |

OTHER PUBLICATIONS

International Telecommunication Union, ITU-T Telecommunication Standardization Sector of ITU, H.248 Annex F (Nov. 2000), "Series H: Audiovisual and Multimedia Systems, Infrastructure of Audiovisual Services—Communication Procedures—Facsimile, Tex Conversation and Call Discrimination Packages, Annex F", International Telecommunication Union H.248 Annex F (Nov. 2000), pp. 1-42.

International Telecommunication Union, ITU-T Telecommunication Standardization Sector of ITU, H.248 Annex G (Nov. 2000), "Series H: Audiovisual and Multimedia Systems, Infrastructure of Audiovisual Services—Communication Procedures, User Interface Elements and Actions Packages, Annex G", International Telecommunication Union H.248 Annex G (Nov. 2000), pp. 1-16.

International Telecommunication Union, ITU-T Telecommunication Standardization Sector of ITU, H.248 Annex H (Nov. 2000), "Series H: Audiovisual and Multimedia Systems, Infrastructure of Audiovisual Services—Communication Procedures, Transport Over Stream Control Transmission Protocol (SCTP), Annex H", International Telecommunication Union H.248 Annex H (Nov. 2000), pp. 1-6.

International Telecommunication Union, ITU-T Telecommunication Standardization Sector of ITU, H.248 Annex J (Nov. 2000), "Series H: Audiovisual and Multimedia Systems, Infrastructure of Audiovisual Services—Communication Procedures, Dynamic Tone Definition Package, Annex J", International Telecommunication Union H.248 Annex J (Nov. 2000), pp. 1-7.

International Telecommunication Union, ITU-T Telecommunication Standardization Sector of ITU-, H.248 Annex I (Nov. 2000), "Series H: Audiovisual and Multimedia Systems, Infrastructure of Audiovisual Services—Communication Procedures, Transport Over ATM, Annex I", International Telecommunication Union H.248 Annex I (Nov. 2000), pp. 1-7.

International Telecommunication Union, ITU-T Telecommunication Standardization Sector of ITU, X.509 (Nov. 1993), "Data Networks and Open System Communications—Directory—Information Technology—Open Systems Interconnection—The Directory: Authentication Framework", ITU-T Recommendation X.509 (Previously "CCITT Recommendation") ISO/IEC 9594-8 : 1995 (E), pp. 1-43.

ECTF—Bringing Interoperability to Computer Telephony, "S. 100 Media Services, vol. 6: Media Resources and Services, Revision 2.0", Enterprise Computer Telephony Forum, 1998, pp. 1-259.

Greene et al., Nortel Networks, Cisco Systems, Marconi, "Media Gateway Control Protocol Architecture and Requirements", Network Working Group Request for Comments: 2805, Category: Informational—The Internet Society (2000), pp. 135.

Stewart et al., Motorola, Cisco, Siemens, Nortel Networks, Ericsson, Telcordia, UCLA, ACIRI, "Stream Control Transmission Protocol", Network Working Group Request for Comments: 2960, Category: Standards Track—The Internet Society (2000), pp. 135.

* cited by examiner

SYSTEM AND METHOD FOR PROVIDING AUTHENTICATION AND VERIFICATION SERVICES IN AN ENHANCED MEDIA GATEWAY

BACKGROUND OF THE INVENTION

1. Field of the Invention

The present invention generally relates to communication between a first user and at least one other user and more specifically to the authentication and identification services provided to the first user regarding at least one of the other users.

2. General Background and Related Art

Modern telecommunications is frequently carried out over public and private networks comprises a series of points or nodes interconnected by communication paths. Data enters and leaves the network through these nodes. Private networks are often used by businesses and other enterprises to facilitate data and resource sharing and data communication (e.g., electronic mail and file transferring services) among employees. Local telephone companies (also referred to as local exchange carriers or Public Switched Telephone Networks, (PST)) and long distance service providers (also referred to as inter-exchange carriers) are examples of public networks.

Traditional PSTN or "legacy" networks are often referred as Circuit SNetworks (CSN) because they utilize circuit switching, i.e., a type of switching in which the communication path for a particular call is a dedicated physical channel (or "circuit") on which the data exchanged by the parties to the call (the "data stream") flows. Legacy networks are currently being replaced by packet-switched networks. Packet-switching is a method of data transport that encapsulates the data stream in a sequence of data aggregates called "packets", and then transports the packets from source to destination based on a destination address contained within each packet. The packets may, but need not, take the same physical path from source to destination.

Generally, networks used for data traffic and networks used for voice traffic have been physically distinct, and engineered to different requirements . Current trends in public networks are toward "converged" communications networks. A "converged" communications network" is a network in which data (including media such as audio and video) and voice are carried using the same method of transport. Typically, the method of transport is packet-based rather than circuit-based.

Converged communications networks are required to interoperate with legacy CSNs. In general, users of different networks need to send voice and other data to each other. Media gateways can be used to interchange such data between networks.

Identification and/or authentication services can be used to secure or protect the data as it is carried over these networks. Identification is the process of identifying a particular entity, e.g., an individual, machine or organization, within a population. Conceptually, identity is information that allows a user to determine who someone is to some defined extent. For example, identity may relate to an individual identity or a corporate identity (e.g., a legitimate employee of a company with which the first user wants to conduct business, e.g., over the telephone). Identity may also be used to authorize someone to spend money via a specific credit card number.

Authentication is the process of determining whether an entity is, in fact, who or what it declares itself to be. Authentication is commonly performed using logon passwords, i.e., user names, passwords or personal identification numbers (PIN). Each user initially registers (or is registered by someone else), using an assigned or self-declared logon password. On each subsequent use, the user must know and use the previously declared logon password. Knowledge of the logon password is assumed to guarantee that the user is authentic; however, logon passwords can be stolen, accidentally revealed, or forgotten, which may leave networks vulnerable to security lapses.

It is becoming increasingly common for Internet business and many other transactions to use more secure authentication processes, such as digital certificates. Digital certificates are typically issued and verified by a Certification Authority (CA) as part of a public key infrastructure (PKI), some of which may conform to the ITU-T Pre-Published Recommendation X.509 (03/00).

Both authentication and identification may also be provided by utilizing biometric data or measurements, including voice characteristics, fingerprints, hand geometry, facial geometry or movement, retina scans or iris scans, in network security. The use of biometric technology generally requires two phases: enrollment, in which an initial Biometric Identification Record (BIR) of a user is created, and authentication/identification, in which the BIR is used to identify or authenticate a user. The initial BIR is constructed by collecting a number of samples through a biometric device. Salient features are then extracted from the samples and the results are combined into the initial BIR. Algorithms, which are usually proprietary, are used to construct the initial BIR. However, the BioAPI Consortium has recognized the need to develop a converged standard for biometric authentication, which allows software developed by different manufacturers to interact.

Typically, the initial BIR is stored by a biometric application and may be matched against processed samples captured from a biometric device (authentication). Alternatively the initial BIR may be matched against a specified population of BIRs to determine which ones match most closely (identification). The initial BIR may be used to replace or augment the logon password to release the digital signature authorizing sales and/or other transactions.

Fingerprints, facial geometry, or other biometric data can be placed on smart cards, which are plastic cards including an embedded microchip that can be loaded with data, such as biometric data. Users can present both a smart card and their fingerprints, faces or other biometric data to merchants, banks, or telephones for identification or authentication.

BRIEF DESCRIPTION OF THE DRAWINGS

The above and other aspects, features and advantages of the present invention are further described in the detailed description which follows, with reference to the drawings by way of non-limiting exemplary embodiments of the present invention, wherein like reference numerals represent similar parts of the present invention throughout the several views, and wherein.

DETAILED DESCRIPTION OF EXEMPLARY EMBODIMENTS

Figure 1:
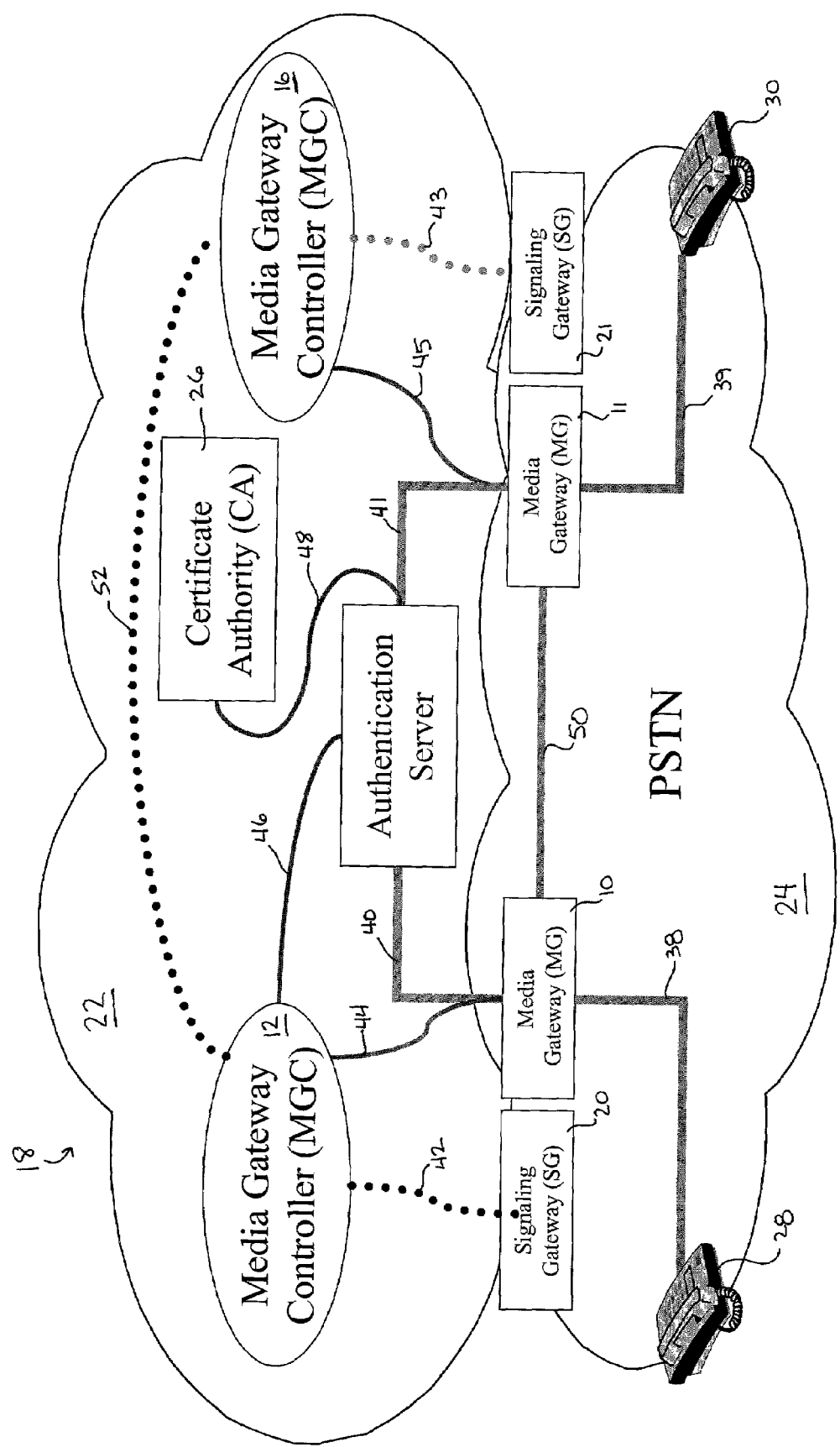
FIG. 1 is a schematic representation of a media gateway and media gateway controller in an exemplary public telephone network.

However, there exists a need for a system and method for providing identification and authentication services using biometric or other data to a first user regarding a second user in, for example, a converged network environment and in association with a media gateway.

The ITU-T Pre-Published Recommendation H.248 standard, otherwise known as the Megaco specification, and/or the requirements for the H.248 protocol define the terms "media gateway", "media gateway" (also called a "multi-media gateway"), "media gateway controller", "media resource", and "termination" as they are used throughout this disclosure. The BioAPI specification, version 1.00 defines the terms "biometric service provider" ("BSP"), "biometric identification record" ("BIR"), and "payload" as they are used throughout this disclosure.

As a result of, e.g., Megaco, the IETF and the ITU, promulgation of multi-media standards, many media processing components are currently available that support advanced capabilities. Accordingly, it is desirable to provide media control protocols to fully exploit the full capabilities of commercially available media processing components. Such media control protocols may be particularly useful to telecommunications service providers providing media services to the private and public sector.

Many of these commercially available media processing components conform to the Enterprise Computer Telephony Forum (ECTF) S.100 Media Services specification (Enterprise Computing Telephony Forum, S.100 Revision 2.0, Volumes 3-4). The S.100 framework provides an extensive specification of media services, which includes playing and recording of audio data files and includes speech recognition and text-to-speech conversion.

Illustrated embodiments of the present invention facilitate or provide identification or authentication services to a first user or "authentication client" regarding a second user or another "authentication client" using H.248/Megaco-controlled media gateways to request identification or authentication services from an "authentication server", which fulfills the request. The authentication clients may be implemented in smart phones or each could be built into a media gateway (MG). The authentication server may be configured in a network as a media gateway (MG). Alternatively, in other embodiments of the invention, an authentication client program, such as control program 32, 34, in the client devices 28, 20 may request authentication or identification services. The request may be transmitted to the MG 10, 11, where the MG 10, 11 may then transmit a request to an "authentication server" to provide authentication and identification services. In one illustrated embodiment, an authentication certificate is returned back to the MG 10, 11, which in turn serves it back to the "authentication client" program in the client device 28, 30. A media gateway (MG) and media gateway controller (MGC) can be used in many environments, including private network environments and public network environments.

FIG. 1 illustrates a schematic representation of Media Gateways (MGs) 10, 11 and Media Gateway Controllers (MGCs) 12, 16 in a converged communications network 18. In this example, MG 10 and MG 11 are "authentication clients" in a client/server relationship wherein Authentication Server (AS) 32 is the "authentication server" in the relationship. One MG, the "authenticator", may obtain services from the Authentication Server (AS) to identify or authenticate another MG, the "authenticatee".

Often a converged communications network, such as network 18 illustrated in FIG. 1, is required to support network-based announcements or to support applications that require interactive voice response (e.g., collecting biometric data). This may be accomplished by an AS, for example, AS 32, located somewhere on the converged communications network 18.

As illustrated in FIG. 1, the MGs 10, 11 and Signaling Gateways (SGs) 20, 21, respectively, terminate a packet-switched network 22, e.g., administered or provided by a CSN 24. The CSN 24 may be representative of a local phone company (e.g., local exchange carrier). The packet-switched network 22 (e.g., long distance carrier) may be configured to function to transmit a call from client device 28 to client device 30.

The MGs 10, 11 may be configured to convert data received from CSN 24 into packetized voice data for transmission over the packet-switched network 22 and vice versa. In the exemplary embodiment, for example, the MG 10 may also be configured to route the packetized voice and other audio data to the CSN 24 to complete a call from a first client device 28 to a second client device 30. The first and second client device 28, 30 in the illustrated embodiment are dumb phones (e.g., phones whose only function is to perform PSTN or wireless signaling and transmission of voice). In other embodiments, the phones may be smart phones (phones that can perform the functions of an authentication client, e.g., digital wireless telephones, WAP telephones, or other mobile telephones that can also send and receive data), where the user of the phone nonetheless chooses to use the MG as an authentication client.

The MGs 10, 11 may be physical machines or sets of machines, including both hardware and software, that may be configured to operate to provide media mapping and/or transcoding functionality between potentially dissimilar networks, one of which is presumed to be a packet, frame or cell based network. For example, a MG might terminate CSN facilities (e.g., trunks, loops, etc.), packetize the media stream, if it is not already packetized, and/or deliver packetized traffic to a packet network. The MG 10, 11 may perform these functions in the reverse order for media streams flowing from the packet-based network 22 to the CSN 24. However, MGs are not limited to providing translation between packet, frame and/or cell-based networks and CSNs. Other examples of media resources provided by MGs include conference bridges with all packet interfaces, Interactive Voice Recognition units (IVRs), Audio Resource Function modules (ARFs), or a voice recognition system with cell interfaces, coders, announcements, tones, modems, etc. MGs may also contain software and hardware that enable the functionality associated with an SG. The ARFs are described in RFC 2805 "Media Gateway Control Protocol Architecture and Requirements", April 2000.

MGs 10 and 11 might be implemented as a set-top box or "phones" (i.e., devices that look like phones, but include terminals with microphones, speakers, and buttons attached thereto).

The IETF and the ITU have recognized that a MG may contain many types of media processing resources. The Megaco/H.248 requirements specification states that a MG may include the following functionality: the ability to provide reservation and release of resources, the ability to provide state of resources information and media processing using media resources.

MGs 10, 11 and SGs 20, 21, respectively, facilitate communication and/or cooperation between the packet-switched network 22 and the CSN 24. This cooperation allows for adaptation of the call signaling protocols through SGs, e.g., SGs 20, 21, and adaptation of the audio data (typically in the form of a "stream") through MGs, e.g., MGs 10, 11. Authentication Server (AS) 32 may be connected to the packet-switched network 22 to provide authentication certificates to a user of the first client device 28 for authentication or identification of a user of the second client device 30. The first and second client devices 28, 30 may include a user control program 34, 36, respectively, configured to, among other things, communicate data to and from the authentication server 32. For example, if a first user (e.g., the "Authenticator") seeks to identify or authenticate a second user (e.g., the "Authenticatee"), the packet-switched network 22 may route the call from the client device 28 to the AS 32. The AS 32 may be configured such that the "Authenticator" using the first client device 28 may interact with components of the AS 32 to identify or authenticate some aspect of the identity of the "Authenticatee").

The media data on transmission path 38 (from client device 28 to MG 10) may be circuit-switched and the media data, i.e., voice, audio or video data, on path 40 (from MG 10 to AS 32) may be packet-switched. When the first user using client device 28 dials a long distance phone number, call signaling may be transmitted over CSN 24 using, for example, an SS7 protocol. SG 20 may receive call signals from a circuit-switched trunk line, which may form part of the CSN 24. SG 20 may send the SS7 signaling to the MGC 12 using, for example, a TCP/IP carrier for transport or any other appropriate protocol, such as RFC 2960, Stream Control Transmission Protocol (SCTP), a standard developed by the IETF. The CSN 24 may send this signaling to packet-switched network 22, which may be for example, a long distance service provider provide long distance services for the client device 28. To accomplish this, the call signaling data may be transmitted over path 42, for example, by using SCTP to MGC 12. In the illustrated embodiment, MGC 12 is configured to function as master device controlling MG 10, for example, done by administrative action, such as, for example, by a network administrator.

Control data, such as commands, responses, and events, as defined by H.248, may be transmitted on path 44 between the MGC 12 and the MG 10 in accordance with the Megaco/H.248 protocol. In response to the MGC 12 receiving signaling data from the SG 20, the MGC 12 may communicate to the MG 10 that client device 28 is seeking connection to the AS 32 and that the MGC 12 has the requisite signaling. In response, the MG 10 may terminate or connect paths 38 and/or 50 and provide the transcoding necessary to convert the circuit-switched audio data on the path 38 into packet-switched audio data on the path 50. MG 10 may then route the packet-switched audio data to the IP address of the AS 32.

The AS 32 may be controlled by MGC 12,16 via commands conforming to the Megaco/H.248 protocol transmitted across paths 46. MGC 12 may also signal the AS 32 of incoming media data, i.e., voice, audio, or video data over paths 46.

The MGC 12 may then instruct the AS 32 to terminate the packet-switched media data transmitted from the media gateway 10 to the AS 32. The MGC 12 may then instruct the AS 32 to, for example, to request a certificate corresponding to the second user from a Certificate Authority (CA) 26 in response to input signals transmitted from the control program 34 of the client device 28. The AS 32 may communicate with the CA 26 via the internet, as schematically represented at 48 in FIG. 1. After the request for the certificate corresponding to the second user is transmitted to AS 32, the MGC 12 may disconnect the client device 28 from the AS 32 and the MGC 12, 16 may command the MGs 10, 11, respectively, to cooperate to transmit packet-switched media data therebetween on path 50. Signaling data may be transmitted from MGC 12 to MGC 16 over path 52.

Call signaling data may be transmitted over path 43 to MGC 16, which may be configured to function as a master device controlling MG 11. Data may be transmitted on path 45 between the MGC 16 and the MG 11 in accordance with the Megaco/H.248 protocol. In response to the MGC 16 receiving signaling data from the SG 21, the MGC 16 may communicate to the MG 11 that client device 30 is seeking connection to the AS 32 and that the MGC 16 has the requisite signaling. In response, the MG 11 may terminate or connect paths 39 and/or 41 and provide the transcoding necessary to convert the circuit-switched data on the path 39 into packet-switched media data on the path 41. MG 11 may then route the packet-switched data to the IP address of the AS 32 (assuming that network 22 uses TCP/IP protocol). MGC 16 commands the MG 11 to communicate the phone call to the client device 30 over the network 18.

Figure 2:
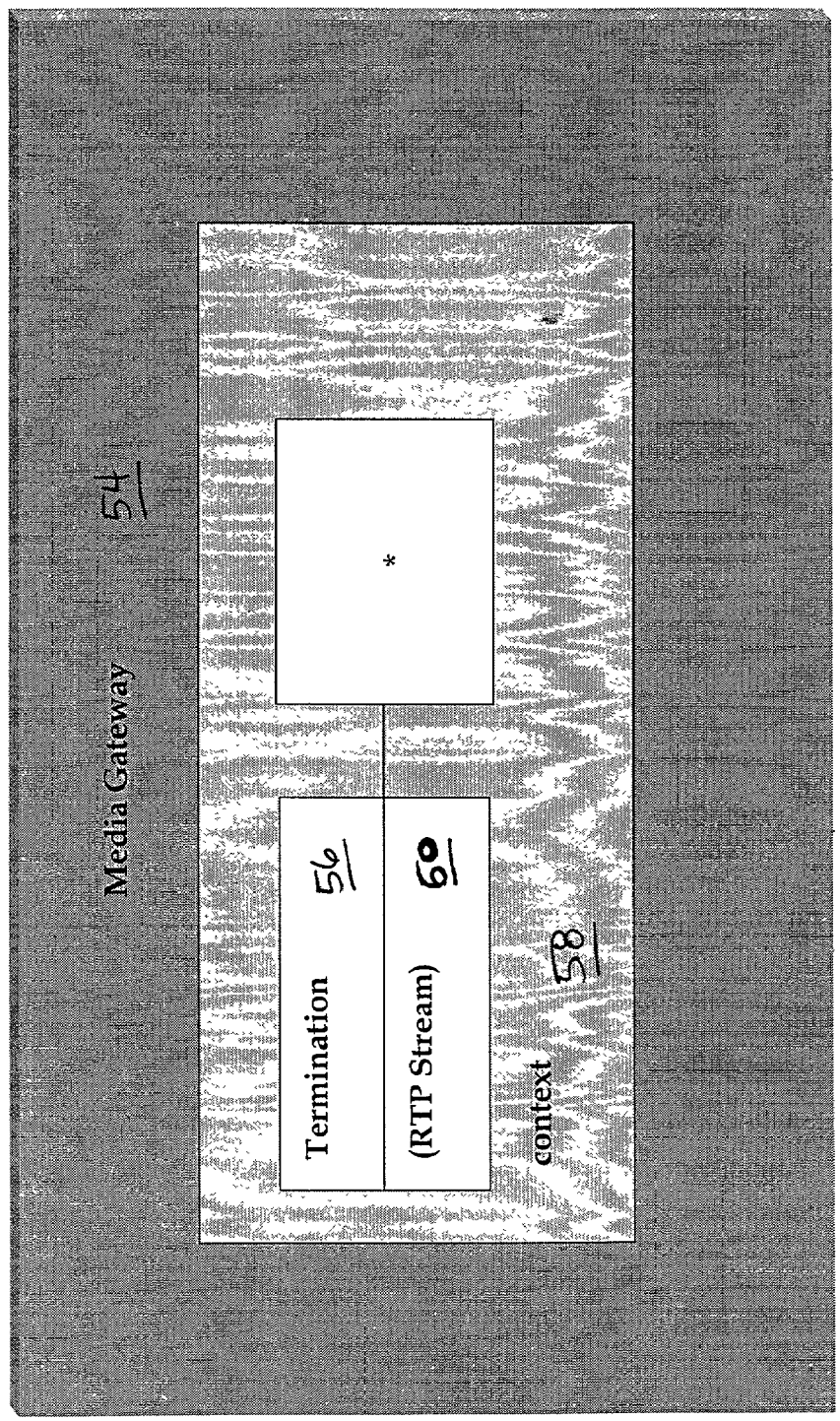
FIG. 2 is a schematic representation of a media gateway context showing a single termination in the context.

FIG. 2 shows a MG 54, which may implement a set of terminations 56 interconnected through contexts 58 to provide an adaptation function or transcoding between media streams with different characteristics (e.g., different encodings, different physical transports). MG 54 may be representative of either MG 10 or MG 11. Context 58 is a logical concept and represents the space in which one or more terminations 56 are connected. Termination 56 is a point of entry and/or exit of media data as it flows relative to the MG 54. The single termination 56 of FIG. 2 can represent, for example, a connection to the phone, such as a logical network interface card, associated with a Real-time Transfer Protocol (RTP) stream 60. The RTP stream 60 is associated with a particular media gateway so that media data can be played on the RTP stream 60. In this instance, FIG. 2 represents the identification of a particular smart or dumb telephone as being the termination 56 associated with the MG 54.

Figure 3:
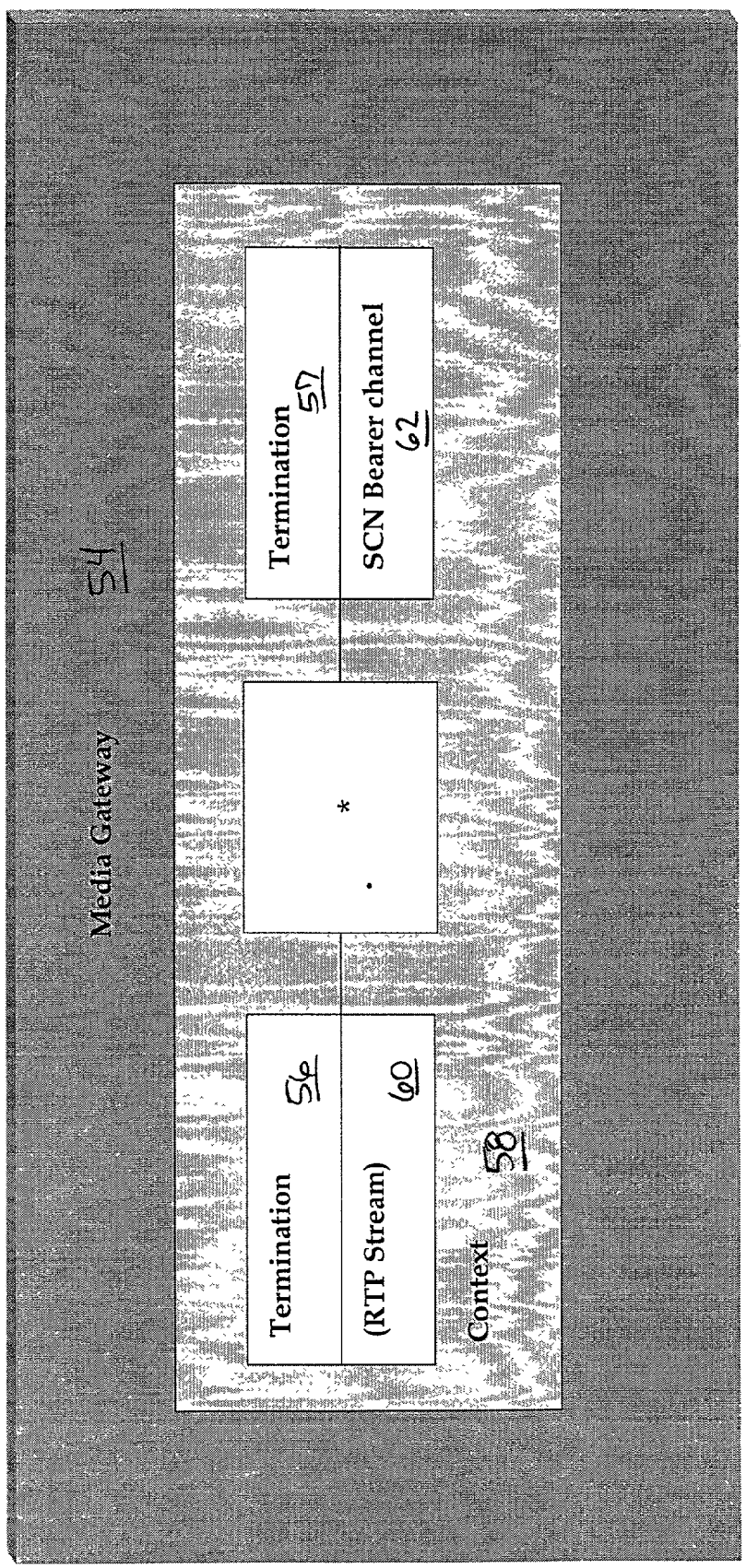
FIG. 3 is a schematic representation of a media gateway context showing two terminations in the context.

As shown in FIG. 3, when a MG is commanded to connect two or more terminations, the MG understands how the flows entering and leaving each termination are related to each other. H.248/Megaco defines the base functionality of gateways, terminations, and contexts.

FIG. 3 is a schematic representation of two terminations 56, 57 connected in the single context 58. The RTP stream 60 of FIG. 3 may be, for example, packetized voice or other audio media data. Termination 57 may be, for example, voice data from a CSN network or channel 62. Therefore, FIG. 3 may represent the MG 54 terminated to a CSN, such as CSNs 24, 26, and a packet-switched network, such as packet-switched network 22.

Figure 4:
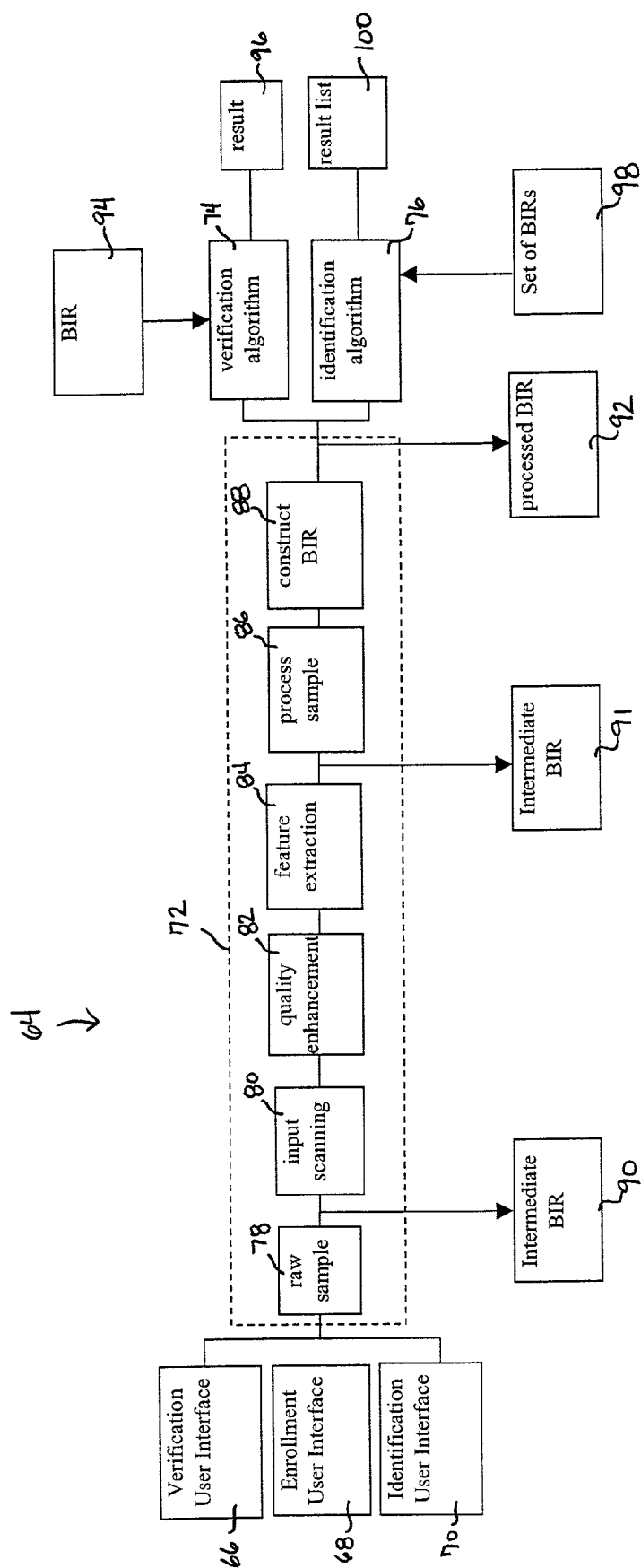
FIG. 4 is a schematic representation of an exemplary biometric service provider architecture.

Generally, biometric technology may be used by a first user to authenticate or identify a second user over a converged communications network, such as the converged communications network 18. FIG. 4 illustrates an exemplary Biometric Service Provider (BSP) 64 providing functions that may be implemented therein to support authentication and identification. The basic functionality of BSPs is defined in the BioAPI specification, Version 1.00

Biometric devices, such as client devices 28, 30, may include the exemplary BSP 64. The BSP 64 may include one or more user interfaces to collect biometric data, for example, voice characteristics, fingerprints, hand geometry, facial geometry or movement, retina scans or iris scans, for construction of the initial BIR. The collected biometric data may also be used to construct a set of templates or BIRs. The user interfaces may be configured to interact with client devices, such as client devices 28, 30, and may include a verification user interface 66, an enrollment user interface 68, and an identification user interface 70. The verification user interface 66, enrollment user interface 68, and identification user interface 70 may be configured to interact with certain components of the client devices 28, 30 to collect initial biometric data or samples for constructing initial BIRs.

For example, the verification user interface 66, the enrollment user interface 68, and/or the identification user interface 70 may be in the form of a microphone located in one of the client devices 28, 30 to collect voice data or an initial voiceprint BIR. For either identification or authentication, a dialog system may be employed in which a computer system interacts with an end-user using speech in order to collect information from the end-user. The dialog system may prompt the end-user to speak a phrase and collect the response as raw data by performing ARFs, such as recording audio (if supported), speech recognition (if supported), auditory feature extraction (if supported), auditory feature recognition (if supported) and/or speech verification/identification (if supported).

The dialog system may be in the form of a Audio Resource Module, such as a record audio module, speech recognition module, an auditory feature extraction module, an auditory feature recognition module and/or a speech verification/identification module. The dialog system may be, for example, stored on Audio Enabled Gateways (AEG), MGs including ARFs, but it is not necessary for the dialog system to be stored on a AEG. The dialog system may be, for example, stored on a separate server, such as an Audio Resource Server (ARS), which functions to perform certain audio resource functions, or on the AS 32.

The BSP 64 may also include software or processing algorithm(s) 72 that convert the scanned biometric information into digital form, a verification or authentication algorithm 74 and an identification algorithm 76. Optionally, a database (not shown), may also be included in the BSP 64, and may be used to store the initial biometric data for comparison with inputted biometric data.

In converting the biometric input, the software 72 may process a value that can be compared with the initial BIR to provide authentication or identification services, for example, by an algorithm. As illustrated, the software 72 may include a raw biometric sample or complex analog data stream module 78 for data produced by the number of user interfaces, a biometric input scan module 80 for processing or pre-processing the raw biometric sample, an enhancement module 82 for enhancing the quality of the scanned biometric input, a feature extraction module 84, a scanned biometric sample processing module 86, and a BIR construction module 88. BIRs are defined in the BioAPI specification, version 1.00 and may refer to any biometric data that is returned to the application. Additionally, BIRs may be signed and/or encrypted.

Intermediate BIRs 90, 91 may be constructed while the "match points" are being processed, for example, after use of the raw biometric sample collection module 78 or the feature extraction module 84, respectively, and a processed BIR 92 may be constructed during the performance of the BIR construction module 88 described above.

For authentication services, the verification or authentication algorithm 76 may compare the processed BIR 92 with BIR 94, such as an initial BIR, for a particular user to create a result or score 96. The result 96 serves as a representation of the probability that the processed BIR 92 matches the initial BIR of a particular user and may be used to authenticate the identity of that particular user.

For identification services, the identification algorithm 78 may compare the processed BIR 92 with a specified population or set of BIRs 98, and determine which initial BIRs match most closely. The specified population or set of BIRs 98 may be, for example, associated with a particular organization or company, and the processed BIR 92 may, for example, be collected from a user posing as a member of that particular organization or company. Identification is used to identify if that user is a member of that particular organization or company by providing result list 100. The result list 100 may include a set of probabilities with each probability being associated with one of the templates in the specified population or set of BIRs 98.

Figure 5:
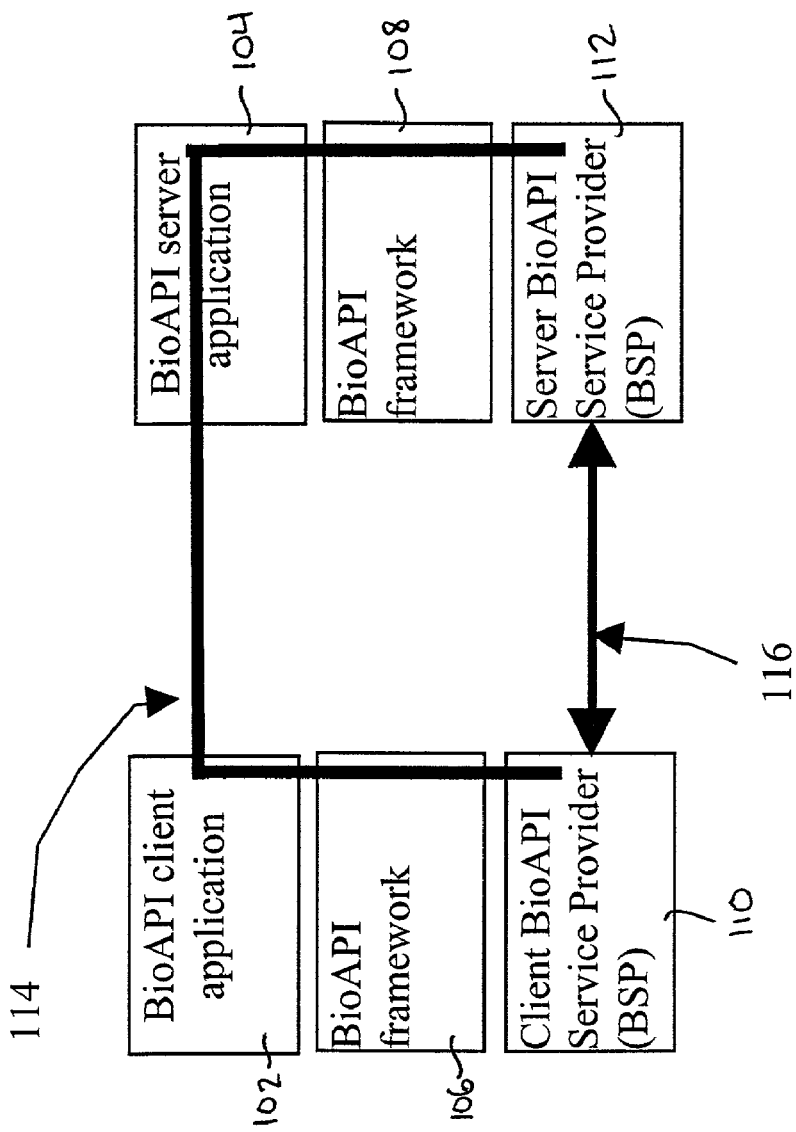
FIG. 5 is a schematic representation of BioAPI architecture in an exemplary biometric process.

FIG. 5 illustrates an end-user module, such as client device 28, 30, and a MG, such as MG 10, 11, interacting with one another to provide authentication or identification services. As illustrated, either a client BioAPI application 102 or a server BioAPI application 104 is the "driving" application or "master" device, and performs the underlying logic of the application. The other of the client or server BioAPI applications 102, 104 is the "partner" application or "slave" device, and may act as a conduit for data being exchanged between the client and server parts of the BioAPI framework 106, 108, respectively. BSPs 110, 112 may be in communication with respective client and server parts of the BioAPI framework 106, 108. In one exemplary embodiment, the server or driving BSP 112 may deliver messages to the client or partner BSP 110 using a streaming callback interface 113.

In exemplary embodiments of the invention, the AS 32 may be the driving application and the client and server parts of the BioAPI framework 106, 108 may collect BIRs for providing the authentication or identification services.

The stream input output interface 114 is a communication channel that is configure to carry messages and other payloads from the server BSP 112 to the client BSP 110, or between BSP 110, 112 and the driver application, which is represented by the server BioAPI application 104 in FIG. 5. The stream input output interface 114 may be used by the partner application, represented by the client BioAPI application 102 in an exemplary embodiment, to deliver messages to the partner BSP, represented by the client BSP 110. The stream input output interface 114 may also obtain a return message to transmit to the driving BSP, represented by BSP 112 in FIG. 5.

For BSP-to-BSP authentication services, a payload channel 116 may be established on which a protocol, which may be private, operates between the client and server BSPs 110, 112. Alternatively, a POTS telephone may be attached to the server BSP in configurations in which the end-user module does not perform authentication.

Figure 6:
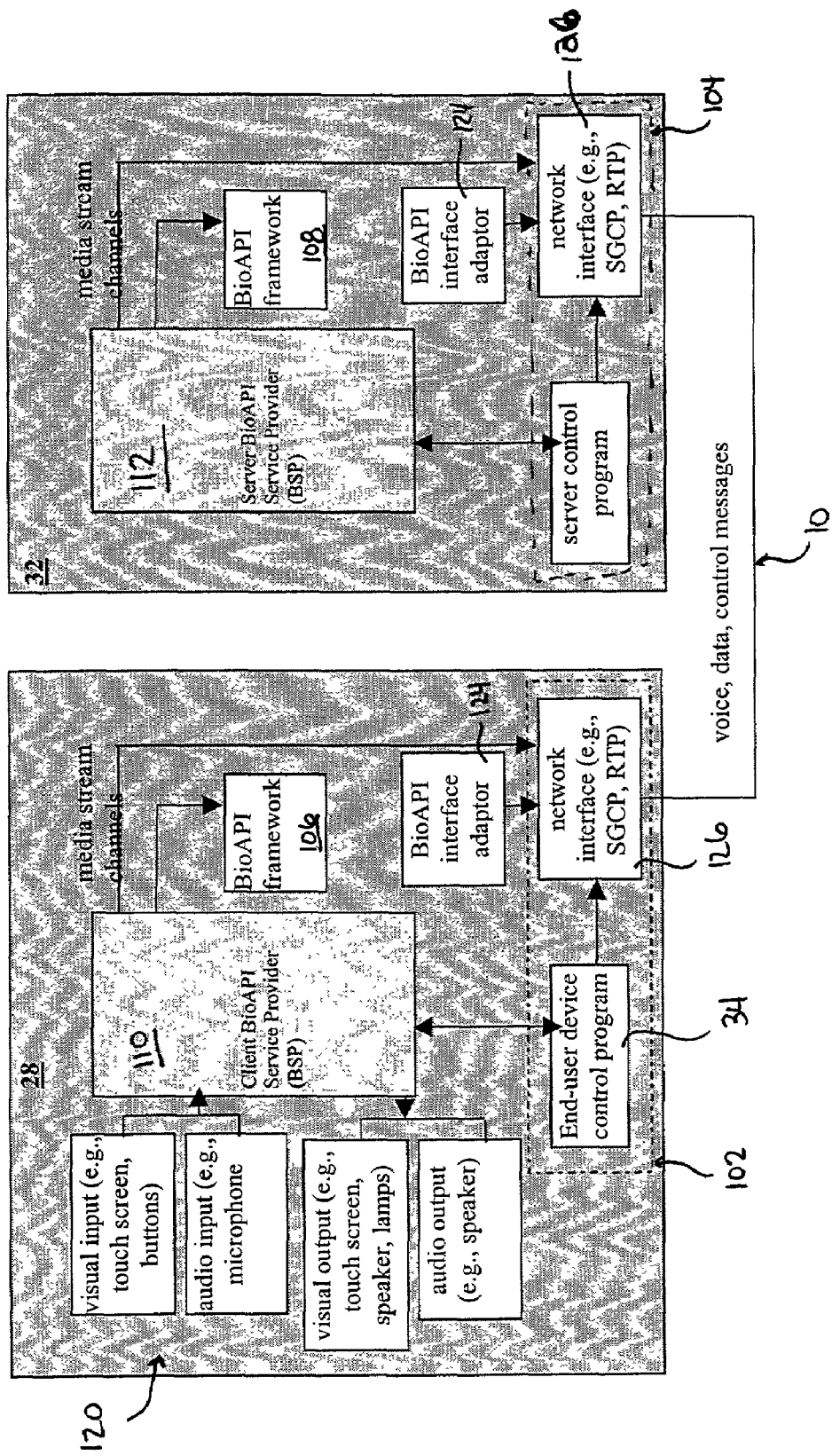
FIG. 6 is a schematic representation of an exemplary authentication services architecture according to the present invention.
Figure 7:
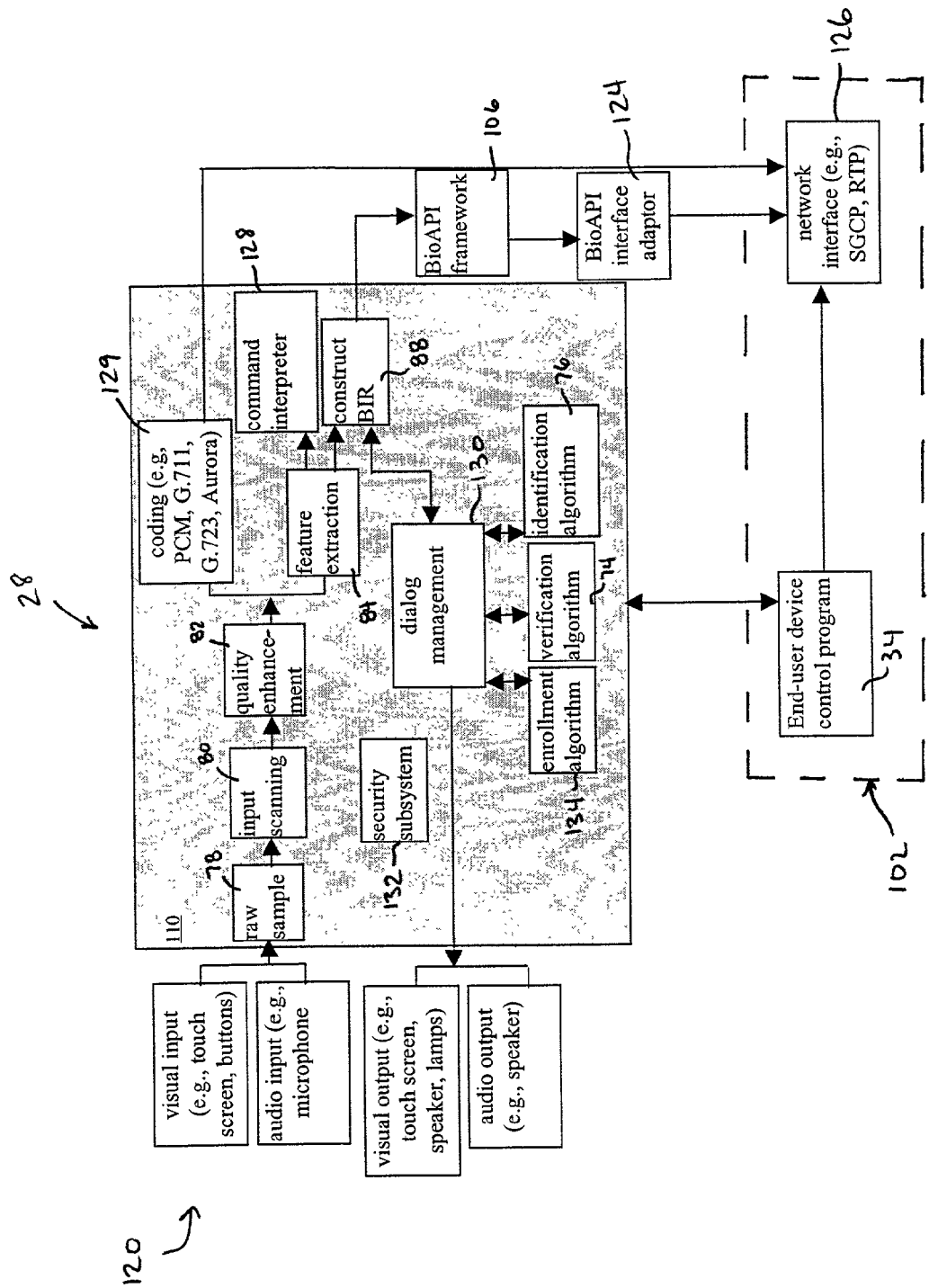
FIG. 7 is a schematic representation of an exemplary authentication client architecture according to the present invention.
Figure 8:
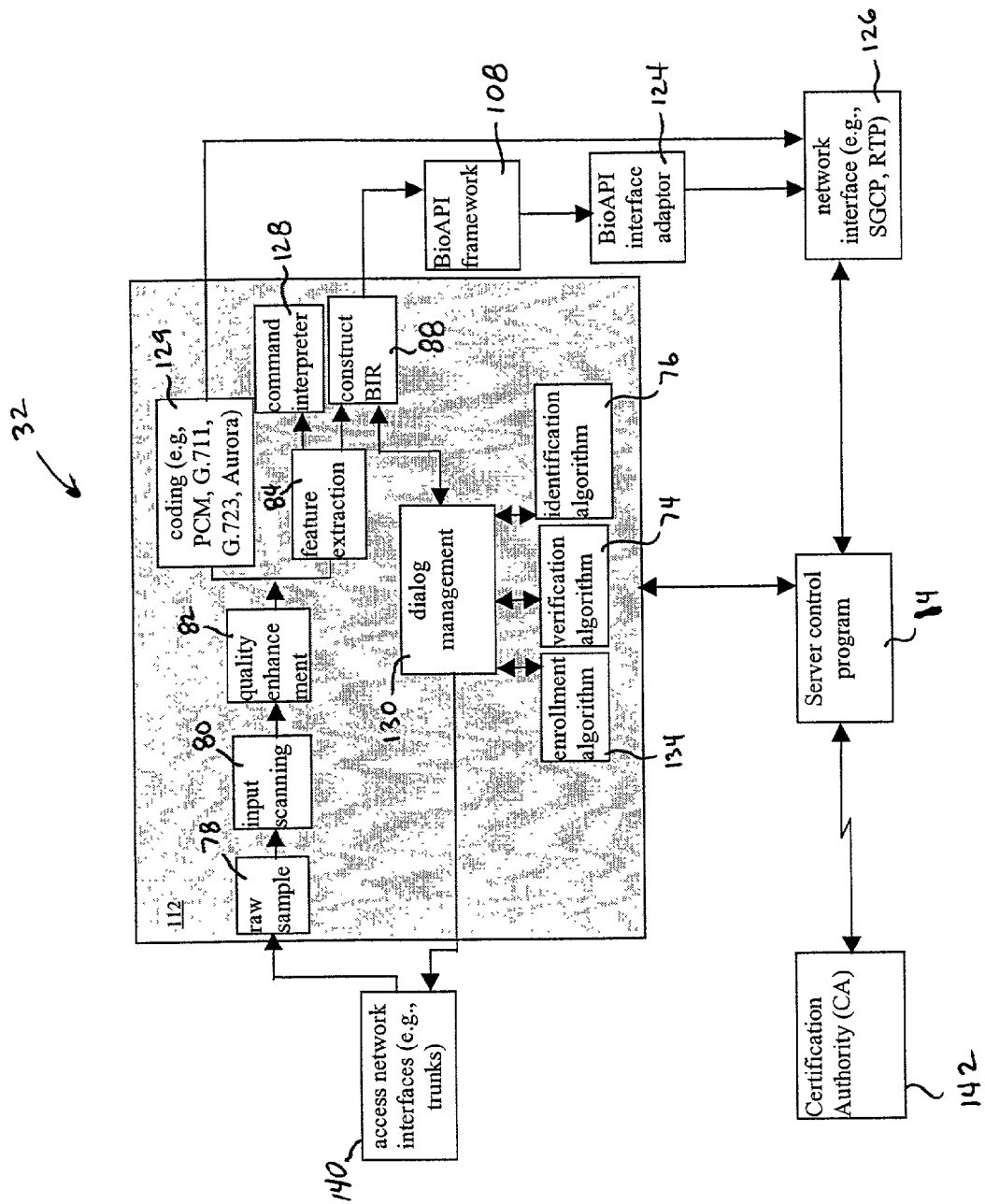
FIG. 8 is a schematic representation of exemplary authentication server architecture according to the present invention.

FIGS. 6-8 illustrate exemplary hardware that may be used to implement BSPs, such as BSP 64 illustrated in FIG. 5, to collect and authenticate or identify biometric data as described above. Since the client devices 28, 30 and the AS 32 may include similar hardware components, a description of the hardware components of the client device 28 will suffice to give an understanding of the client device 30 and the AS 32. The AS 32 may include hardware components not in either client device 28, 30, of which description will be provided relating to FIG. 8. In FIG. 8, the client devices 28, 30 and the AS 32 cooperate in a client/server relationship as described above. FIGS. 6 and 7 show the client device 28. In one exemplary embodiment of the invention, the client device 28 may include various user interfaces, generally indicated as BSP 120, coupled to the BSP 110. The BSP 110 may perform the same functions (designated by the same reference numerals) as the BSP 64 illustrated in FIG. 4. The various user interfaces may include, for example, a visual input (e.g., a touch screen or buttons), an audio input (e.g., a microphone), a visual output (e.g., touch screen, speakers, lamps, LEDs) or audio output (e.g., a speaker).

The BSP 110 is coupled to the control program 34 via interface 122, which may carry messages of the BSP-BSP protocol to exchange messages between the BSP 110 and the control program 34. As described above, the BSP 110 is also coupled to the BioAPI framework 106.

The client device 28 further includes a BioAPI interface adapter 124, which multiplexes the various message streams (e.g., media (voice, audio, data, etc.), control messages) into a channel carried by media gateway or network interface 126. An interface (not shown) may extend from the BioAPI framework 106 to the BioAPI interface adapter 124 to carry messages to and from the stream input output interface 114.

The BSP 110 may send media data, such as voice, data or control messages, through the media gateway or network interface 126, which interfaces with MGs 10, 11. For example, the media gateway or network interface 126 may be configured to receive reference biometric user input through the MGs 10, 11, which are coupled to the AS 32 and enable communication of media data from the client devices 28, 30 to the AS 32.

As shown in FIG. 7, the control program 34 of the client device 28 includes a command interpreter 128. The command interpreter 128 may be configured to monitor input from the various user interfaces 120, e.g., keypad, touchpad or audio interface, etc. and receives input from the various user interfaces 120, such as visual input and audio input. The visual or audio input may be in any form including any mixture of keypad key presses, spoken language, or input from a touch screen. The command interpreter 128 is configured to interpret the input as commands on behalf of the end-user using the client device 28.

In addition to basic operations of a telecommunication device, such as on-off operation, call control functionality, etc., are commands that allow an end-user to subscribe to a security service, grant permission to perform an identity authentication, and request an identity authentication.

Exemplary voice commands or dialog commands may, for example, include a "subscribe" command which may be defined as an end-user subscribing to authentication service, such as from the AS 32. An "unsubscribe" command may be defined as an end-user unsubscribing from authentication service, such as from the AS 32. An "enroll" command may be defined as enrolling subscriber in a verification system and a "disenroll" command may be defined as a subscriber disenrolling from the verification system. A "grant" enroll command may be used to identify a request that an additional subscriber is to be enrolled and whose trust relationship is derived from the currently verified end-user. An "identify" command may be defined as identifying current user of device. A "local verify" command may be defined as permitting a device to authenticate a current user. A "remote verify" command may be used to identify a request that authentication service, such as that supported by AS 32, may authenticate the identity of a remote party. A "monitor verify" command may be used to identify a request that the authentication service monitors the remote party to ensure that the speaker, caller or second end-user does not change during a call. A "set properties" command may be defined as setting the parameters governing the behavior of the telephone or other client device. These parameters may include default media stream encoding, use of and parameters for authentication, use of and parameters for monitoring, grant of remote verification, etc. A "view properties" command may be defined as viewing the properties or parameters currently established in the telephone or client device.

The control program 34 may also include a dialog management module 130, which may read and interpret voice commands or dialog commands in conjunction with the command interpreter 128. For example, the dialog management module may prompt the user to perform tasks using the various user interfaces 120. For example, the dialog management module 130 may be in the form of the dialog system described above or may prompt the user to enter a pass code via Dual Tone Multi-Frequency (DTMF) or via the touchpad, or to speak a pass phrase, such as the voice commands or dialog commands described above. The dialog management module 130 collects the information entered by the user through the user interfaces 120 and may perform bounds checking on the data as is well known in the art. For example, if the dialog management module 130, or any other speech recognizer, has recognized data of a certain regular type, such as numbers representing a phone number, numbers representing currency, or town names, it can then compare the certain type of data to a stored database, for example, of town names, etc.

The control program 34 may also include a security module 132, which may maintain the integrity of the control program 34, and any certificates stored in the device, in a tamper-resistant and tamper-evident manner.

The enrollment algorithm 134 operates in a manner consistent with the BioAPI specification. The enrollment algorithm 134 may interact with the dialog management portion 130 of the control program 34 to prompt the user to provide a biometric sample, such as a voiceprint, a fingerprint or hand geometry using the necessary biometric devices. The enrollment algorithm 134 may interact with the BIR construction module 88 to create the BIR 92 (FIG. 4).

The verification algorithm 74 operates in a manner consistent with the BioAPI specification. The verification algorithm 74 interacts with the dialog management portion 130 of the control program 34 to prompt the user to provide a biometric sample, such as a voiceprint, a fingerprint or hand geometry, which it uses to verify the identity of the current telephone user, e.g., the caller.

The identification algorithm 76 operates in a manner consistent with the BioAPI specification. The identification algorithm 76 interacts with the dialog management portion 130 of the control program 34 to prompt the user to provide a biometric sample, such as a voiceprint, a fingerprint or hand geometry, which it uses to identify the current user of the telephone from a database of enrolled users of the phone, such as the set of BIRs 98 illustrated in FIG. 4.

The control program 34 may also include a coding module 129, which may encode the media data into Pulse Code Modulation (PCM), G.711, G.723, Aurora, or any other known format for transmission through the MGs 10, 11.

FIG. 8 shows the AS 32 having a server control program 144, which may support substantially similar functionality as the client devices 28, 30. The AS 32 may include additional hardware components that are not present in the client devices 28, 30. For example, the AS 32 may include external access network interface 140, rather than physical input/output devices, such as the user interfaces 120. Telephone gateways or trunks may be examples of the access network interface 140. The AS 32 may maintain a profile of hardware and software capabilities of the client devices 28, 30 (e.g., visual output, or audio output only) and modify the user interface of the AS 32 accordingly.

The AS 32 includes an additional interface to a certificate server 142, such as a CA, used to support the authentication services of the AS 32. The AS 32 obtains or derives subscriber certificates from the external certification server 142, rather than deriving from certificates held by the client devices 28, 30, as will be described below. In a variation of the exemplary embodiments of the invention, the AS 32 may accept whatever output media stream is offered by the client device to perform BSP services. Output media streams may include trunks, e.g., ISDN, IP, and/or other interfaces for dumb phones and other feature-poor end-user devices. In this variation, the AS 32 may perform BSP services to a potentially raw or analog media stream.

Figure 9:
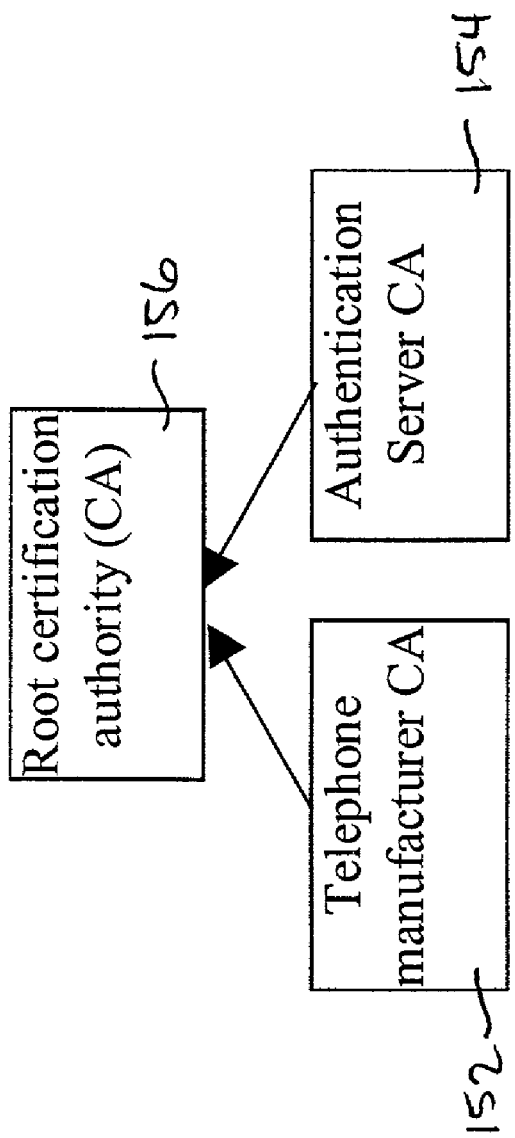
FIG. 9 is a schematic representation of an exemplary certification authority hierarchy used in authentication systems.

FIG. 9 shows an exemplary certification authority hierarchy used by an AS, for example, AS 32, in public key-based authentication. The ITU-T Pre-Published Recommendation X.509 (03/00) describes a public key-based authentication which provides methods for signing an electronic document, i.e., a block of data, in a secure fashion, certificates, and a hierarchy of Certification Authorities (CAs).

Figure 10:
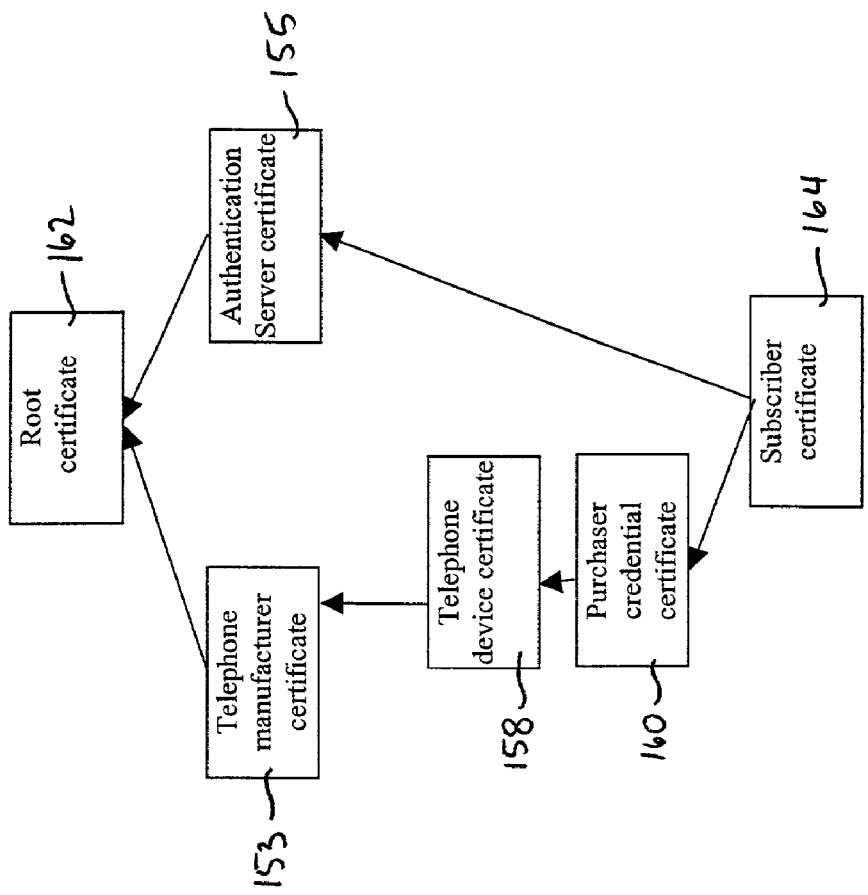
FIG. 10 is a schematic representation of exemplary certificates used in authentication systems.

FIG. 10 is a schematic representation of exemplary certificates used in public key-based authentication. Certificates, such as public key certificates, are digitally signed documents that serve to validate the sender's authorization and name. CAs may serve as authorities in public and private networks that issue and manage security credentials and public key for message or data encryption. As part of a public key infrastructure, a CA checks with a Registration Authority (RA) to verify information provided by the requester of a digital certificate. If the RA verifies the requester's information, the CA can then issue a certificate.

Therefore, CAs attest that the sender's name is the one associated with the public key in the document. Public key certificates are part of a public key infrastructure that deals with digitally signed documents.

Depending on the public key infrastructure implementation, the certificate includes the owner's public key, the expiration date of the certificate, the owner's name, and other information about the public key owner.

For example, as illustrated in FIG. 9, the security of client devices, for example, client devices 28, 30, which may be smart telephones, may be attested to by a telephone manufacturer certificate 153 granted by the telephone manufacturer CA 152. Alternatively, if the client devices are dumb phones, the certificate is generated by the authentication client (i.e., an MG 10,11).

Authentication server CA 154 may attest to the credentials of subscribers to an authentication service by granting authentication certificates 155 thereto. In an exemplary embodiment, the root CA 156 may link all the certificates issued by the telephone manufacturer CA 152 and the authentication server CA 154.

The telephone manufacturer CA 152 may grant a telephone device certificate 158, which may be installed in the client devices 28, 30 in a secure, tamper-resistant and tamper-evident manner at time of manufacture, and a purchaser credential certificate 160, which may be derived from the telephone device certificate 158. The purchaser credential certificate 160 may be installed in the client devices 28, 30 in a secure, tamper-resistant and tamper-evident manner at time of purchase. The purchaser credential certificate 160 may be installed by either direct authentication of the identity of a subscriber at point of sale, or by means of a user ID/logon password distributed to the purchaser through a secure channel.

The root CA 156 may grant a root or authentication certificate 162 that identifies the root certification authority 156. The root certificate may be recognized by all the various software applications, which may verify and accept digital certificates in order to verify the authenticity of the information in the root certificate.

A subscriber certificate 164 may be granted by the authentication server CA 154, and may be derived from the purchaser credential certificate 160 and the authentication server certificate 155. For example, the subscriber certificate 164 may be created when a subscriber subscribes to an AS, which thereafter will be able to authenticate the identity of the end-user. For example, the exemplary certification authority hierarchy used by the authentication server 32 in public key-based authentication is based upon a level of trust. The amount of information needed to ensure an adequate level of trust and the level of trust varies. However, as shown in FIG. 9, the root CA 156 may link all the certificates issued by the telephone manufacturer CA 152 and the authentication server CA 154 and is the most trusted CA. Therefore, the telephone manufacturer CA 152 and the authentication server CA 154 can be trusted because the root CA 156 trusts and has granted certificates to these CAs.

Figure 11:
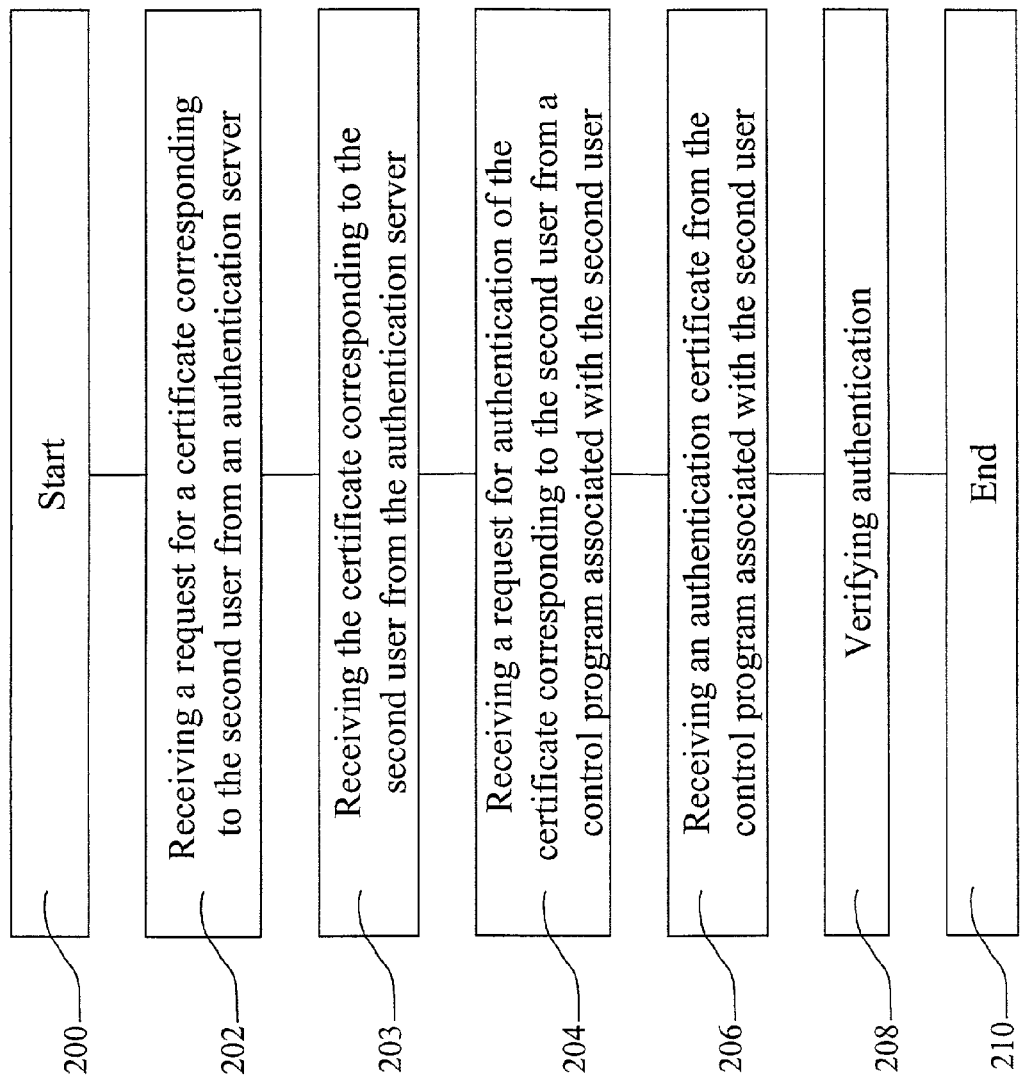
FIG. 11 is a schematic representation of an exemplary method according to the present invention.
Figure 12:
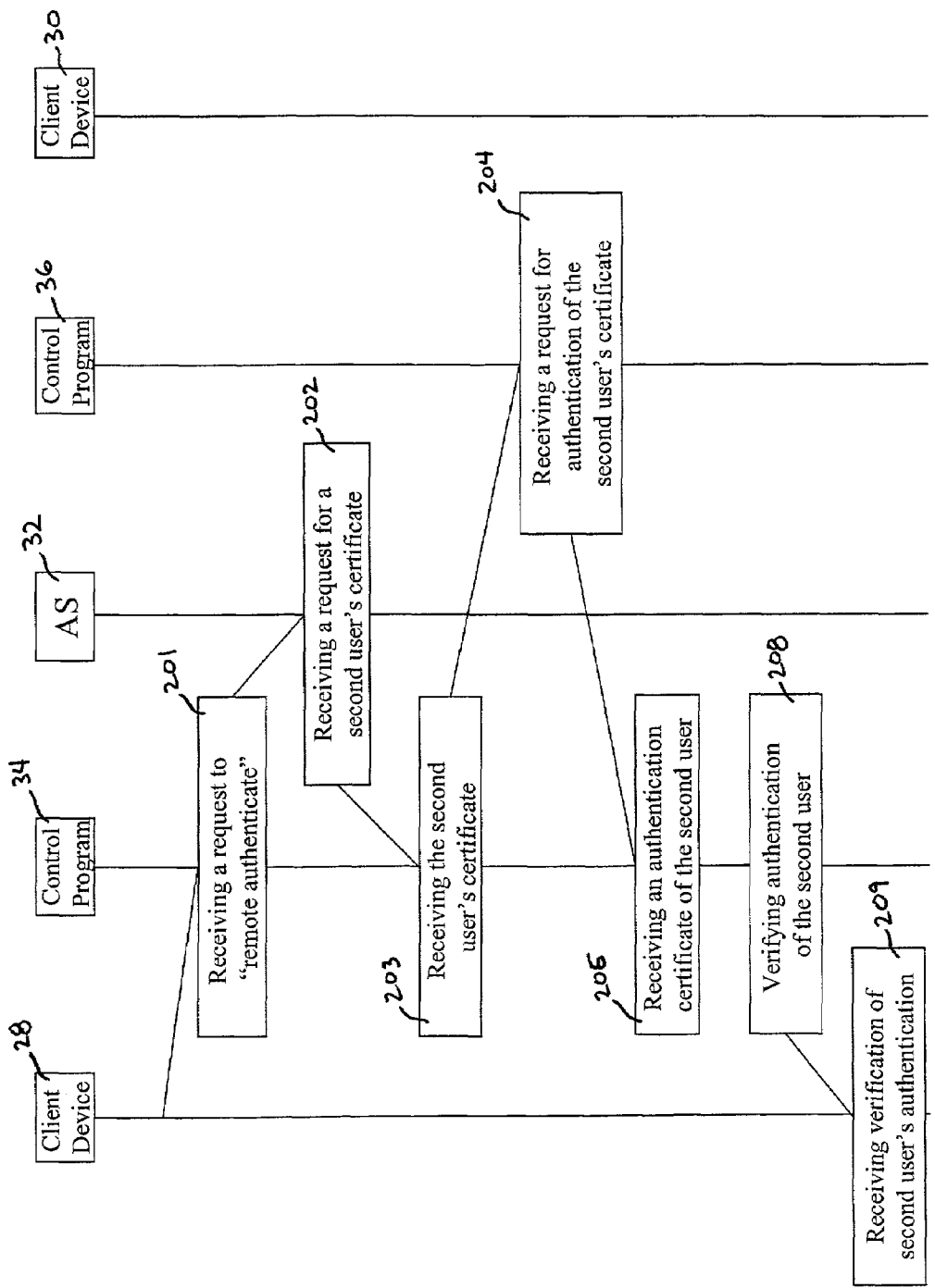
FIG. 12 is a schematic representation of the exemplary method according to the present invention using smart phones.

FIGS. 11 and 12 illustrate an exemplary method according to the present invention for enabling the provision of authentication or identification services to an end-user regarding a caller during or on a call. FIG. 11 illustrates the exemplary method which begins at 200. Control proceeds to 202. At 202, the authentication server receives a request for a certificate corresponding to the Authenticatee.

Control proceeds to 203. At 203, the control program associated with the Authenticator receives the certificate corresponding to the Authenticatee from the authentication server. Control then proceeds to 204, at which the control program associated with the Authenticatee receives a request for authentication of the Authenticatee's certificate from the control program associated with the Authenticator. Control then proceeds to 206. At 206, the control program associated with the Authenticator receives an authentication certificate of the Authenticatee from the control program associated with the Authenticatee and control proceeds to 208. At 208, the control program associated with the Authenticator verifies authentication of the Authenticatee by comparing the authentication certificate corresponding to the second user and received from the control program associated with the second user with the certificate received from the authentication server. Control then proceeds to 209, at which the control program associated with the Authenticator receives verification of the second user's authentication. Control proceeds to 210, at which the method ends.

FIG. 12 illustrates an implementation of the exemplary method shown in FIG. 11 for providing authentication or identification services regarding a Authenticatee (e.g. an unknown caller) to a Authenticator, on a call between the Authenticator and the Authenticatee. In the exemplary implementation, a call has been established between the Authenticator and the Authenticatee through a MG, such as MG 10, 11. Both the Authenticator and the Authenticatee are using client devices 28, 30, respectively, that are authenticated with the AS 32. The client devices 28, 30 may be smart telephones.

At 201, the control program 34 of the client device 28 receives a request to "remote authenticate". For example, the request may be initiated by the Authenticator invoking the authentication feature on his/her client device, such as by speaking a voice command or dialog command into a dialog system or a dialog management module. The voice command or dialog command may be "authenticate" or some other predefined voice command or dialog command. In the exemplary embodiment, the client devices used by the Authenticator and the Authenticatee may be client devices 28, 30, which are smart telephones or smart phones.

At 203, the AS 32 provides a certificate, such as authentication certificate 105, to the control program 34. At 204, the control program 36 receives the request from the control program 34 requesting authentication of the second user's certificate. At 206, the control program 34 receives the authentication certificate from the second verifies authentication by comparing the authentication certificate corresponding to the Authenticatee and received from the control program 36 with the certificate, such as authentication certificate 105, received from the AS 32.

Verifying authentication determines a level of trust between the first user, the authentication server and the second user. The level of trust is a value corresponding to the probability that the authentication certificate corresponding to the Authenticatee and received from the control program associated with the Authenticatee is the same as the certificate received from the authentication server. For example, the level of trust may be determined as a result, such as the result 100 of the BSP 64 (FIG. 4).

As will be appreciated, the operations of the exemplary methods shown in FIGS. 11 and 12 may be performed in a number of different orders. Additionally, the exemplary methods and implementations shown in FIGS. 11 and 12 may include monitoring the communication between the Authenticator and the Authenticatee so that the AS 32 may notify the Authenticator if there is a sufficient probability that the Authenticatee has changed or has become untrustworthy (in accordance with the level of trust described above or the CA hierarchy illustrated in FIG. 9).

It should be appreciated that the authentication certificate corresponding to the second user and received from the control program may include a portion indicating the Authenticatee's identity.

Figure 13:
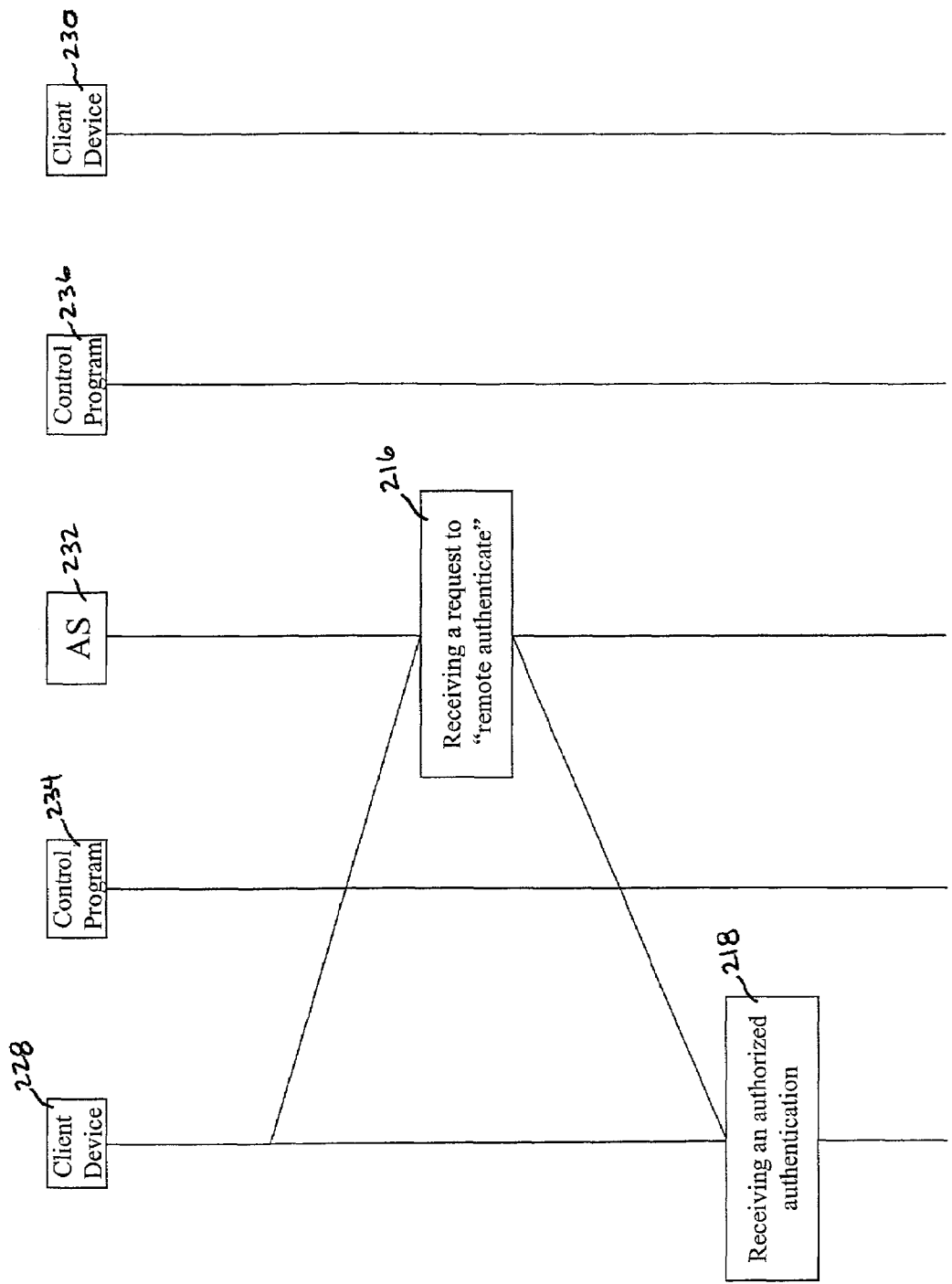
FIG. 13 is a schematic representation of an another exemplary method according to the present invention using dumb phones.

FIG. 13 shows another implementation of the exemplary method in which two dumb telephones or dumb phones 228, 230, represent the client devices 28, 30, respectively. As illustrated, the AS 232 acts as a proxy between the two dumb telephones 228, 230.

The Authenticator may invoke the "remote authorize" authenticate feature using his/her dumb telephone 228 by speaking a voice command or a dialog command, such as "authorize authenticate", into a dialog system or the command interpreter 128 and the dialog management module 130. The voice command or dialog command may be any predefined voice command or dialog command known to the AS 32. At 216, in this exemplary implementation, the AS 32 receives a request from the client device 228 to perform the "remote authenticate" voice command or dialog command, in which authentication service, such as that supported by AS 232, may authenticate the identity of a remote party, e.g., the Authenticatee.

At 218, authentication may be authorized by the AS 232 and the Authenticator using dumb telephone 228 receives an authorized authentication of the second user when the AS 232 finishes or ends the "authorize authenticate" voice command or dialog command.

Figure 14:
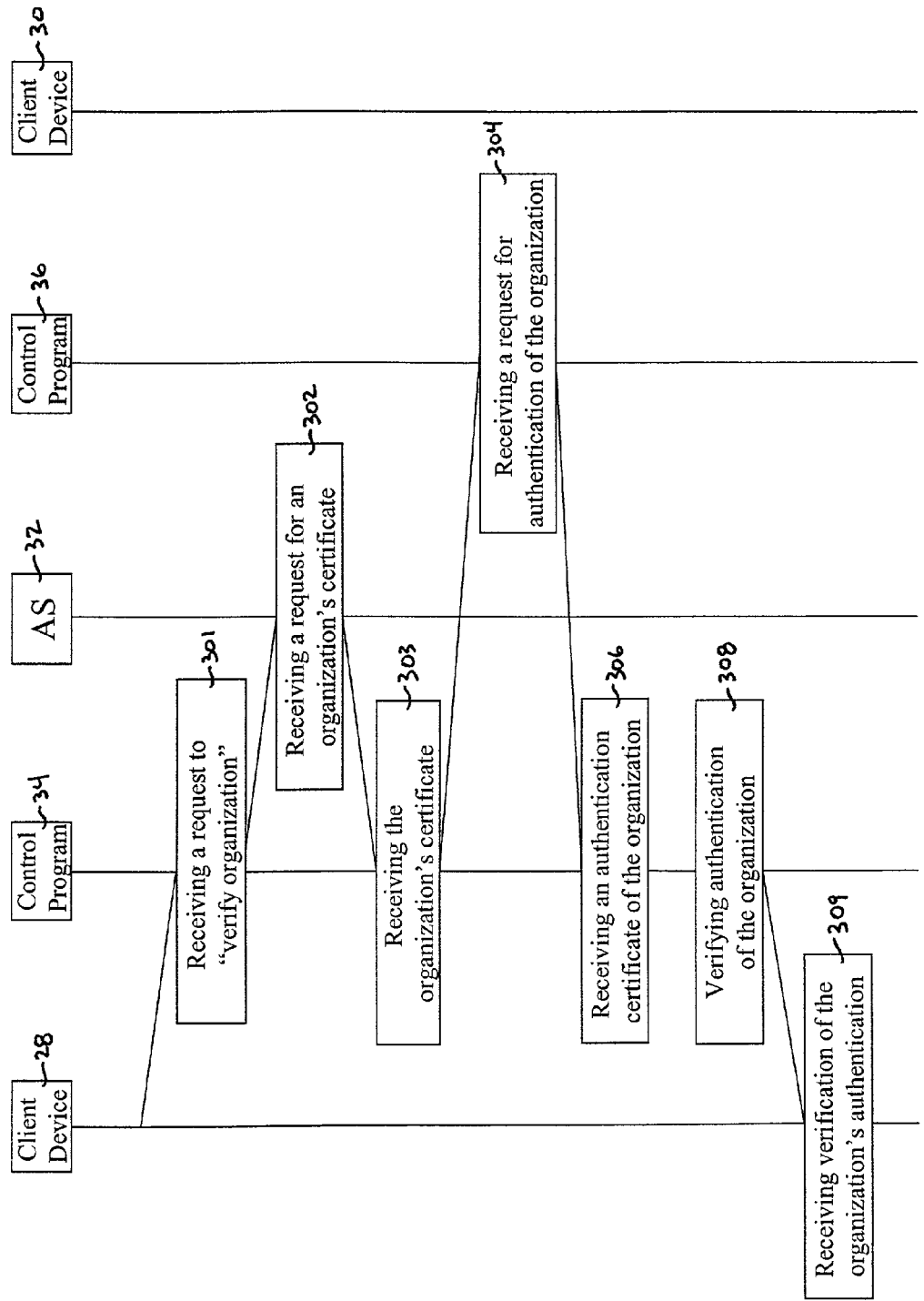
FIG. 14 is a schematic representation of another exemplary method according to the present invention.

FIG. 14 illustrates another exemplary method according to the present invention, which allows a Authenticator using a smart phone, such as the client device 28, to authenticate a Authenticatee as a member of an organization or company rather than a particular individual. In this exemplary method, the organization has been previously enrolled or has created an initial BIR with the AS 32 and the certificate granted to the organization has been provided to the Authenticatee using a smart phone, such as the client device 30, via a secure procedure. In the exemplary method, an unsolicited call has been established between the Authenticatee, which might be a member of organization, to the Authenticator.

At 301, the control program 34 of the client device 28 receives a request to "remote authenticate". For example, the request may be initiated by the Authenticator invoking the authentication feature on his/her client device, such as by speaking a voice command or dialog command into a dialog system. Alternatively, the voice command or dialog command may be read and interpreted by a command interpreter and a dialog management module, such as the command interpreter 128 and the dialog management module 130. The voice command or dialog command may be "remote authenticate" or any other predefined voice command or dialog command, such as those described above. Control then proceeds to 302. At 302, the authentication server receives a request for a certificate corresponding to the organization of which the second user alleges he/she is associated.

Control then proceeds to 303. At 303 in the exemplary implementation, the AS 32 provides a certificate, such as authentication certificate 105, to the control program 34. At 304, the control program 36 receives the request from the control program 34 requesting authentication of the organization's certificate.

Control then proceeds to 306, at which the control program 34 receives an authentication certificate from the organization. Control proceeds to 308, at which the control program 34 verifies authentication of the organization by comparing the authentication certificate corresponding to the organization and received from the control program 36 with the certificate, such as authentication certificate 105, received from the AS 32.

Verifying authentication determines a level of trust between the first user, the authentication server and the second user. The level of trust is a value corresponding to the probability that the authentication certificate corresponding to the Authenticatee and received from the control program associated with the Authenticatee is the same as the certificate received from the authentication server. For example, the level of trust may be determined as a result, such as the result 100 of the BSP 64 (FIG. 4).

Control then proceeds to 309, at which the control program associated with the Authenticator receives verification of the second user's authentication as a member of the organization.

Figure 15:
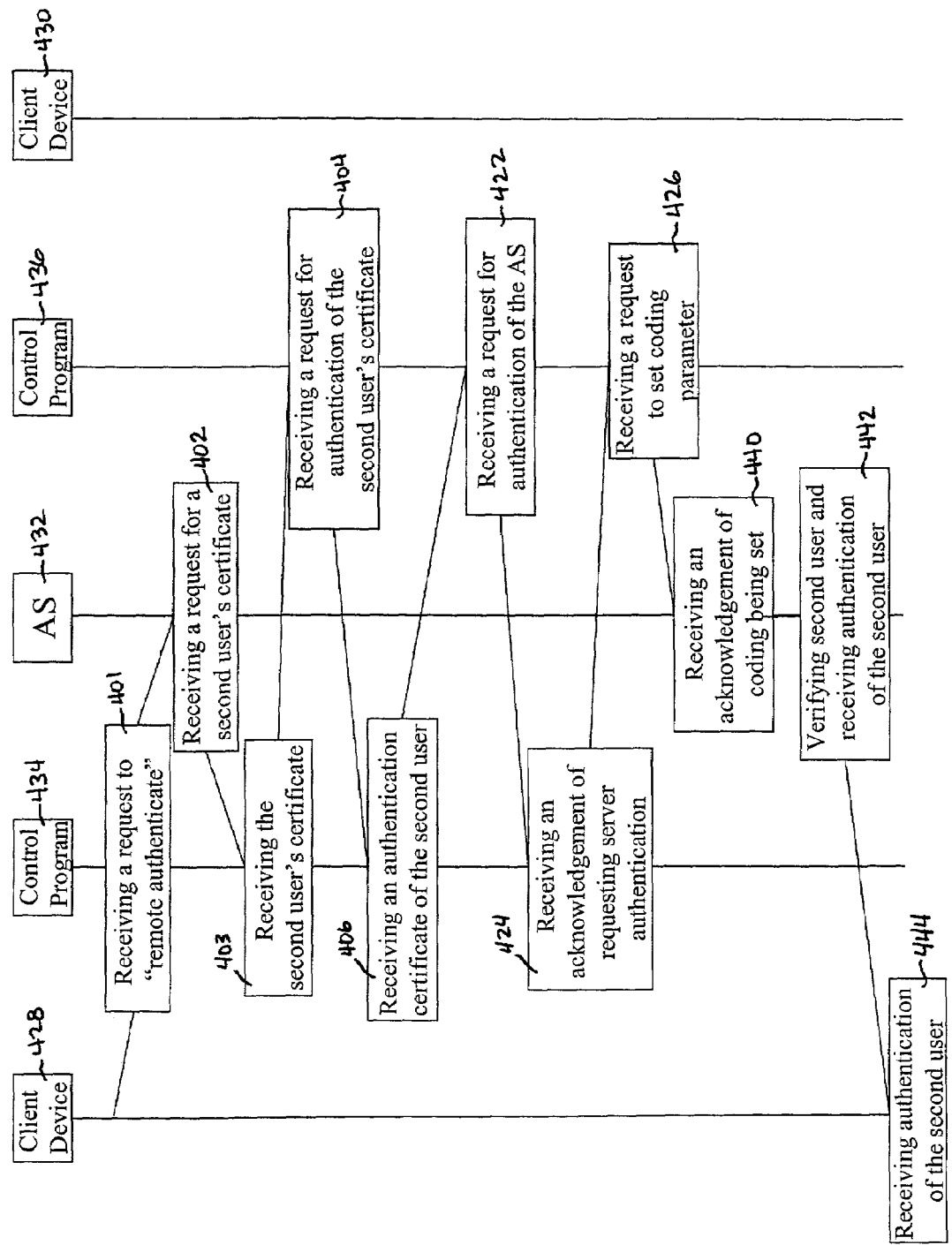
FIG. 15 is a schematic representation of yet another exemplary method according to the present invention.

FIG. 15 illustrates another exemplary implementation of the exemplary method according to the present invention which provides authentication services to a Authenticator using control program 434 of client device 428 regarding a Authenticatee or caller in situations where even though the client devices 428, 430 have been authenticated with an AS 432, the control program 434 of the client device 428 will not trust control program 436 of the client device 430.

In such situations, after an unsolicited call is established from the Authenticatee or caller to the Authenticator, the method allows the client device 428 of the Authenticator, which has failed to authenticate the client device 430 to instruct the client device 428 to switch coding formats, and then use voice verification carried out by the AS 432. Exemplary coding formats may include, for example, G.711, Aurora, PCM, G.723, etc. and may need to be switched to ensure a "direct" authentication, where the client devices 428, 430 are using the same coding formats while performing identification or authentication services. The AS 432 may implement, for example, a command interpreter and a dialog management module or a dialog system for performing the voice verification using the different coding formats. The client device 428 of the Authenticator may fail to authenticate the client device 430 because the client device 430 is not known to the AS 432.

Since the exemplary implementation is similar to the implementation shown in FIG. 12, specifically in the operations shown at 201-206, the above description for operations performed at 201-206 will suffice for operations performed at 401-406, respectively, in FIG. 15.

In the exemplary implementation shown in FIG. 15, the control program 434 does not recognize the authentication of the telephone certificate, such as the Telephone manufacturer certificate 103 or the Telephone device certificate 108. Control then proceeds to 422, at which the control program 436 receives a request from the control program 434 for authentication of the AS, such as AS 432. Control then proceeds directly to 424, at which the control program 434 receives an acknowledgement of requesting server authentication. Control then directly proceeds to 426, at which the control program 436 receives a request to set the coding parameter, for example, the coding parameter of the client device 430 may be switched to G.711 or some other coding format. Control then proceeds to 440. At 440, the AS 432 receives an acknowledgement that a certain parameter of the client device 430 used by the caller is switched to match the parameter requested by the AS 432. The parameter may be any coder, G.711 or some other coding format.

Control then proceeds to 442. At 442, the AS 432 verifies the caller by using user dialog or voice recognition as described above. During verification, the AS 432 determines whether a certain claim of identity is true, such as whether a certain claim of the Authenticatee's identity is true. Verification may be performed using either user dialog or voice recognition as described above.

Control then proceeds to 444, at which the client device 428 receives the authentication of the Authenticatee. For example, the AS 432 returns that the verification is true and that the Authenticatee is authenticated to the control program 434 using dialog or voice recognition. That way, the Authenticator can authenticate or identify a Authenticatee in cases where the control program associated with the Authenticator does not trust the control program associated with the Authenticatee.

While this invention has been described in conjunction with the specific embodiments outlined above, it is evident that many alternatives, modifications and variations will be apparent to those skilled in the art. For example, although the client devices 28, 30, 228, 230, 428, and 430 have been described in the methods according to the present invention and their implementations as either smart or dumb telephones, the client devices 28, 30, 228, 230, 428, and 430 may be any device capable of providing telephony or telecommunications functions, such as computers, or other internet enabled devices.

It should be made clear that the invention has been described in reference to certain illustrated embodiments. Changes may be made, within the purview of the appended claims, without departing from the scope and spirit of the invention in its aspects. Although the invention has been described herein with reference to particular structures, acts and materials, the invention is not to be limited to the particulars disclosed, but rather extends to all equivalent structures, acts, and materials, such as are within the scope of the appended claims.

What is claimed is:

1. A method for providing authentication or identification services to a first user regarding a second user, the method comprising:

establishing a telephone call between the first user and the second user through a media gateway;

detecting a voice command from the first user during the telephone call;

requesting a certificate corresponding to the second user from an authentication server in response to the voice command;

returning the certificate corresponding to the second user;

requesting authentication of the certificate corresponding to the second user from a control program associated with the second user;

returning an authentication certificate from the control program associated with the second user; and verifying authentication by comparing the authentication certificate corresponding to the second user and received from the control program associated with the second user with the certificate received from the authentication server.

2. The method according claim 1, wherein the first user communicates with the second user through a media gateway.

3. The method according to claim 1, further comprising monitoring the communication between the first user and the second user so that the authentication server may notify the first user if the second user changes or becomes untrustworthy.

4. The method according to claim 1, wherein the requesting of the certificate corresponding to the second user from the authentication server, requesting authentication of the certificate corresponding to the second user and the verifying authentication is performed by a control program associated with the first user.

5. The method according to claim 1, wherein the first and second users are using client devices configured to communicate with each other and with the authentication server.

6. The method according to claim 5, wherein the client devices are smart phones.

7. The method according to claim 1, wherein the authentication server has authenticated an organization and the second user is a member of the authenticated organization.

8. The method according to claim 1, wherein verifying authentication determines a level of trust between the first user, the authentication server and the second user.

9. The method according to claim 8, wherein the level of trust is a value corresponding to the probability that the authentication certificate corresponding to the second user and received from the control program associated with the second user is the same as the certificate received from the authentication server.

10. The method according to claim 1, wherein the authentication certificate corresponding to the second user and received from the control program associated with the second user includes a portion indicating the second user's identity.

11. A system for facilitating authentication services comprising:
an authentication server configured to provide an authentication certificate to a user of a first client device for authentication or identification of a user of a second client device, the first and second client devices being configured to communicate with each other and the authentication server, each of the first and second client devices including a user control program configured to communicate data to and from the authentication server, and a media gateway coupled to the authentication server and enabling communication of media data from the first and second client devices to the authentication server,
wherein, the user control program of the first client device, in response to a voice command of the first user requesting authentication of the second user, is configured to receive a certificate corresponding to the user of the second client device and the authentication certificate from the authentication server and being configured to authenticate the user of the second client device by comparing the certificate corresponding to the second client device and the authentication certificate.

12. The system according to claim 11, wherein the authentication server is configured to monitor the communication between the first user and the second user.

13. The system according to claim 11, wherein the authentication server is configured to continuously monitor the communication between the first user and the second user so as to notify the first user if the second user changes or becomes untrustworthy.

14. The method according to claim 11, wherein the control program associated with the first user is configured to request the certificate corresponding to the second user from the authentication server, request authentication of the certificate corresponding to the second user and verify authentication.

15. The system according to claim 14, wherein verifying authentication determines a level of trust between the first user, the authentication server and the second user.

16. The system according to claim 15, wherein the level of trust is a value corresponding to the probability that the authentication certificate corresponding to the second user and received from the control program associated with the second user is the same as the certificate received from the authentication server.

17. The system according to claim 11, wherein the first and second users use client devices configured to communicate with each other and with the authentication server.

18. The system according to claim 17, wherein the client devices are smart phones.

19. The system according to claim 11, wherein the authentication server has authenticated an organization and the second user is a member of the authenticated organization.

20. The system according to claim 11, wherein die authentication certificate corresponding to the second user and received from the control program associated with the second user includes a portion indicating the second user's identity.

* * * * *